United States Patent [19]

Schmidt

[11] Patent Number: 5,793,977

[45] Date of Patent: *Aug. 11, 1998

[54] SYSTEM FOR OBTAINING THE STATE OF NETWORK RESOURCES IN A DISTRIBUTED COMPUTING ENVIRONMENT

[75] Inventor: Michael Anthony Schmidt, Stone Ridge, N.Y.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 640,365

[22] Filed: Apr. 30, 1996

[51] Int. Cl.[6] .................................................. G06F 15/16
[52] U.S. Cl. .................................................. 395/200.54
[58] Field of Search ........................... 395/200.1, 200.11, 395/200.5, 200.51, 200.52, 200.54

[56] References Cited

U.S. PATENT DOCUMENTS

| 4,914,571 | 4/1990 | Baratz et al. ............................. 395/610 |
| 5,282,270 | 1/1994 | Oppenheimer et al. ............ 395/200.11 |
| 5,511,208 | 4/1996 | Boyles et al. ............................ 395/280 |

*Primary Examiner*—Richard L. Ellis
*Attorney, Agent, or Firm*—Floyd A. Gonzalez; Heslin & Rothenberg

[57] ABSTRACT

A system for processing a request for a state of a resource in a distributed processing environment may in general terms comprise receiving an identification of a resource, and identifying a provider associated with an indicator of states of the resource. The system may further comprise obtaining the state of the resource. The state may be obtained by observing the state in memory shared with the indicator, or by retrieving the state from memory in which the state is contained, or by requesting and receiving the state from a remote provider, depending upon the particular resource.

14 Claims, 7 Drawing Sheets

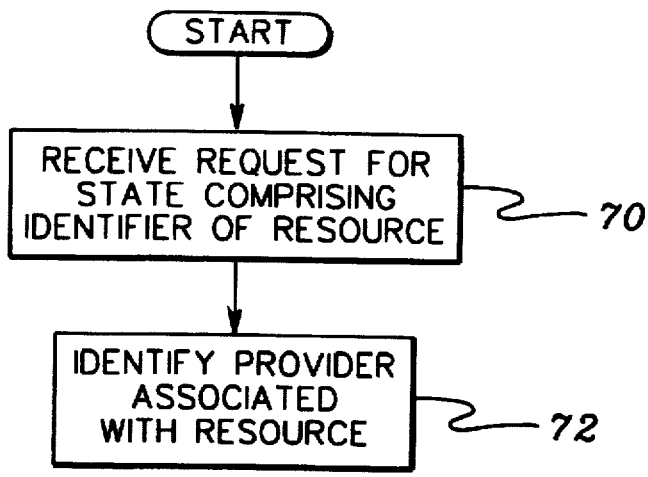
fig. 5
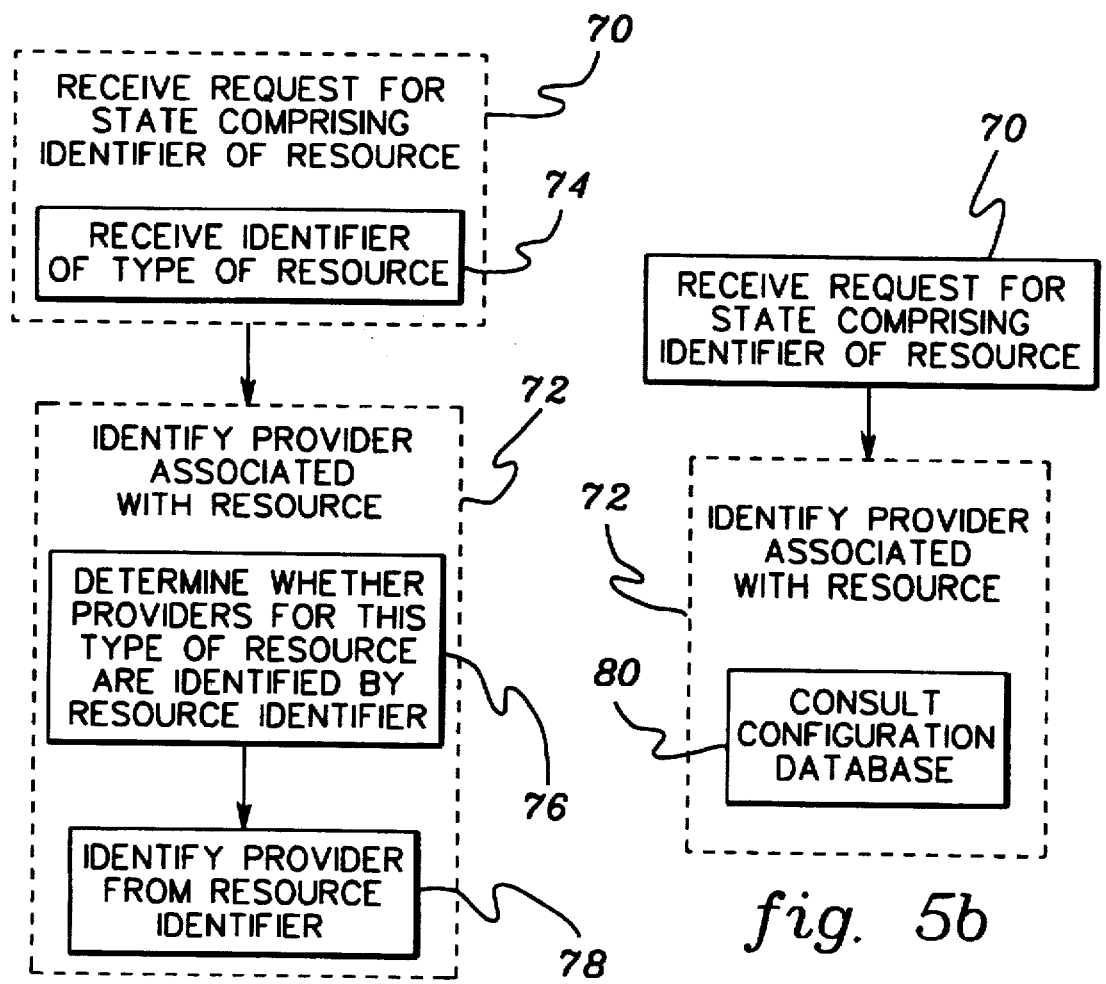
fig. 5a
fig. 5b

SYSTEM FOR OBTAINING THE STATE OF NETWORK RESOURCES IN A DISTRIBUTED COMPUTING ENVIRONMENT

TECHNICAL FIELD

This invention relates, in general, to a distributed computing environment in a network of computers. In particular, the invention relates to processing requests for states of network resources.

CROSS REFERENCE TO RELATED APPLICATIONS

This application contains subject matter which is related to the subject matter of the following applications, which are assigned to the same assignee of this application and are filed on the same day as this application. Each of the below listed applications is hereby incorporated herein by reference:

"Processing Requests For Notice of Events," by Michael Schmidt, Ser. No. 08/640,422, now U.S. Pat. No. 5,768,524;

"Method For Serializing Actions Of Independent Process Groups," by P. R. Badovinatz et al., Ser. No. 08/640,220;

"Method For Barrier Synchronization In A Distributed Computing Environment," by P. R. Badovinatz et al., Ser. No. 08/640,218, now U.S. Pat. No. 5,768,538;

"An Application Programming Interface Unifying Multiple Mechanisms," by P. R. Badovinatz et al., Serial No. 08/640,305, now abandoned.

"A Communications Method Involving Groups Of Processors Of A Distributed Computing Environment," by P. R. Badovinatz et al., Ser. No. 08/641,386;

"A Method For Group Leader Recovery In A Distributed Computing Environment," by P. R. Badovinatz et al., Ser. No. 08/640,219, now U.S. Pat. No. 5,704,032;

"A Method For Managing Membership Of A Group Of Processors In A Distributed Computing Environment," by P. R. Badovinatz et al., Ser. No. 08/640,412; and "Utilizing Batch Requests To Present Membership Changes To Process Groups," by P. R. Badovinatz et al., Ser. No. 08/641,445 now abandoned.

BACKGROUND ART

A computer network may be generally understood as a group of computers which are linked by a communication system. Computers generally comprise a processing unit, one or more memory devices such as random access memory (RAM) or disk storage, and an operating system for controlling the processor and memory devices. Each computer in a network may be referred to as a processing node, or simply as a node. In a network which supports a distributed processing environment, a task may be distributed across several nodes and processed in parallel.

Computer networks include various types of resources, and a given network may include several distinct resources of the same type. Network resources may comprise software or hardware. A resource state indicator may be provided in association with a network resource to indicate states of the resource.

It is often necessary for a client such as an application running on a node of a network to be informed of the current state of a particular network resource. In general it is known that this can be accomplished by having the client directly address the resource state indicator associated with the resource to acquire state information.

Prior art techniques for acquiring state information require the client to provide a request in the form of an address which indicates the location to which the request is to be routed. The client is supplied with an address for each resource state indicator and presumes that each address will be valid at all times. In the event that a resource relocates to another node, for example, in the event of a node failure, the client will be unable to continue to obtain states of that resource because the address which the client has for that resource state indicator will no longer be valid.

SUMMARY OF THE INVENTION

The shortcomings of the prior art are overcome, and additional advantages are provided, through the present invention. In general, the present invention allows clients to obtain state information for a resource without the need to specify the destination of the request. The invention allows the client to request the state of a resource by simply indicating the resource of interest. A distributed subsystem determines the provider which is capable of fulfilling the request and may obtain the requested information. The client can therefore reliably request states of a resource using a single identifier irrespective of whether the resource has changed location in the network.

The invention may be embodied in a system for processing a request for a state of a resource. A system embodiment of the invention may in general terms comprise means for receiving an identification of a resource for which state information is desired and means for identifying a provider associated with an indicator of states of that resource. The system may further comprise means for obtaining the state of that resource. The means for obtaining the state may be means for observing the state in memory, or means for retrieving the state from a provider of states of the resource depending on the location of the resource state indicator.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

FIG. 5 depicts a method for processing a request for state information in accordance with the invention.

FIG. 5a depicts details of an embodiment of the method of FIG. 5.

FIG. 5b depicts details of an embodiment of the method of FIG. 5.

BEST MODE FOR CARRYING OUT THE INVENTION

The invention in general terms is embodied in a distributed subsystem which allows a client to obtain state information for a resource through a local subsystem daemon without the need to specify the destination of the request. The invention allows the client to request the state of a resource by simply indicating the resource of interest to the daemon. The daemon identifies a provider associated with an indicator of states of the resource and may obtain the requested information. The client can therefore reliably request states of a resource using a single identifier irrespective of whether the resource has changed location in the network.

Figure 1:
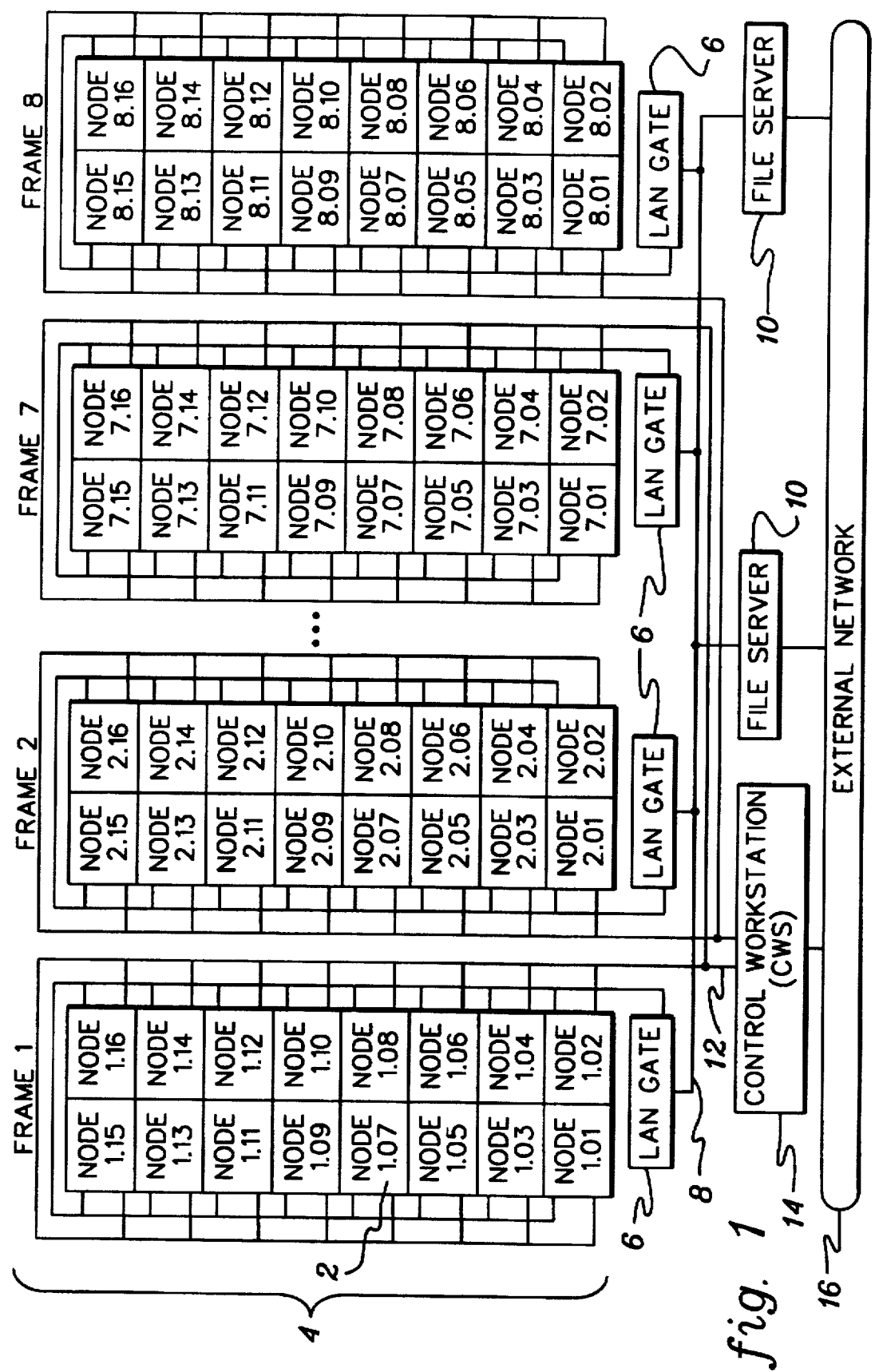
FIG. 1 depicts an exemplary network for supporting a distributed processing environment.

Reference is made to FIG. 1, which depicts an exemplary network for supporting a distributed processing environment. The network includes a plurality of nodes 2 which are grouped into frames 4 each containing sixteen nodes. Each frame is associated with a LAN gate 6 which controls communication over a communication path 8 between individual nodes of the frame and file servers 10. Each node is further associated through a communication path 12 with a control work station 14 which provides network monitoring functions and provides a link for communication with external networks 16. Each node may comprise a RISC/6000 computer running AIX, a UNIX based operating system provided by INTERNATIONAL BUSINESS MACHINES, INC. Each LAN gate may comprise a RISC/6000 computer, or a computer network connection to the LAN, or a network router. Those of ordinary skill in the art will recognize that many aspects of this exemplary network, such as the number of nodes, the type of communication paths, or the machines comprising the nodes and the LAN gates, may be modified while still maintaining the general function of supporting a distributed processing environment.

Figure 2:
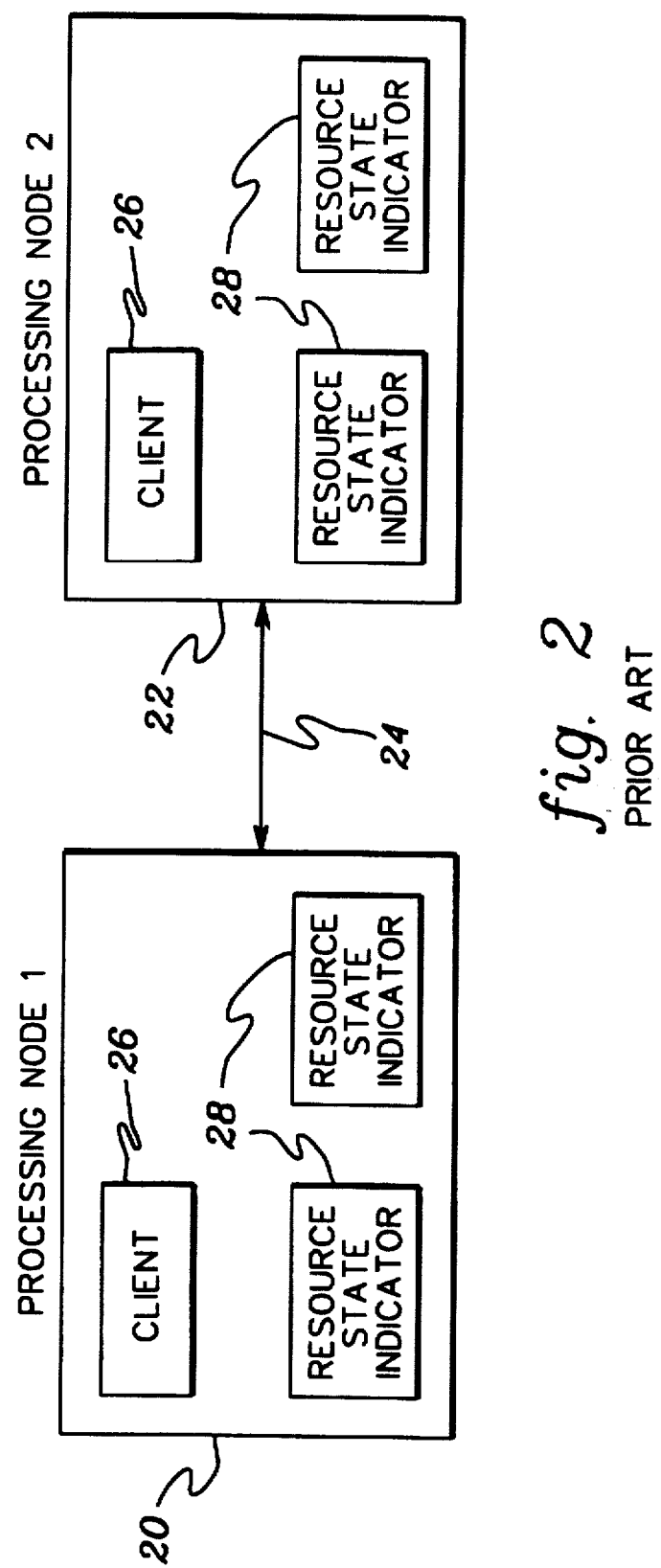
FIG. 2 depicts exemplary processes and resource state indicators on processing nodes as known in the prior art.

One or more processes may be distributed over the nodes of a network such as that depicted in FIG. 1. FIG. 2 illustrates a typical prior art configuration of two exemplary nodes in an exemplary distributed processing environment. In this example, first and second processing nodes 20 and 22 are joined by a communication path 24. Each processing node supports a client process 26. Each processing node further supports one or more resource state indicators 28 which provide states of network resources. A resource state indicator may be an independent process running on the node, or it may be, for example, a component of a software subsystem which provides information about the subsystem. Network resources may be understood to be aspects of the network which are prespecified and which can be represented, for example, by a quantity, a percentage, a count, or a binary state. For example, the operational state of a network node may be defined as a resource, and may be represented as being either up (operational) or down (non-operational). Similarly, the amount of time which a software subsystem has spent on a particular process may be defined as a resource which may be expressed as a quantity representing the amount of time. Those of ordinary skill in the art will be aware of the many additional types of network resources which exist in a distributed processing environment. A number of resource state indicators may be provided by the AIX operating system discussed above.

Referring still to FIG. 2, prior art techniques require a client such as the client 26 of the first processing node 20 to directly access the particular resource state indicator associated with the resource for which the client needs state information. This requires the client to provide routing information in order to properly provide its request to the appropriate resource state indicator. In the event that the resource state indicator corresponding to a particular resource has relocated, for example due to a node failure, the client will no longer be able to receive states of that resource because its routing information will no longer be valid.

Figure 3:
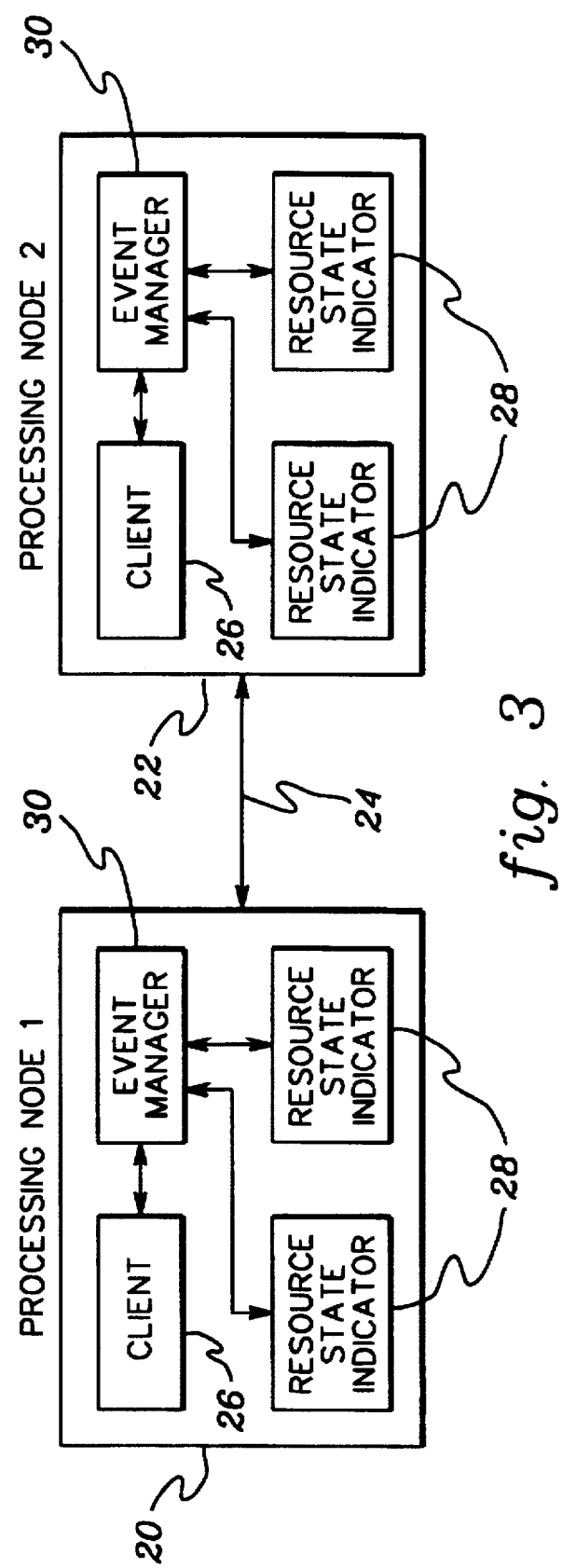
FIG. 3 depicts exemplary processes and resource state indicators on processing nodes in conjunction with an event management subsystem embodying the invention.

Reference is now made to FIG. 3, which shows an exemplary embodiment of the invention in which an event management daemon 30 is provided at each node of the exemplary network. The event management daemon 30 is capable of communicating with clients 26 and resource indicators 28 located on its processing node, as well as with its peer event management daemons 30 located on other nodes of the network. The event management daemon 30 is further capable of acting as a provider of states of resources which it may obtain from local resource state indicators 28. The event management daemon 30 may receive requests for states of resources from clients. These requests need only identify the resource of interest. Having received an identifier of a particular resource, the event management daemon then obtains the requested state information. If the event management daemon determines that the resource state indicator corresponding to the resource of interest is located on its own node, the event management daemon directly obtains information from the indicator and provides it to the client. If the event management daemon determines that the resource state indicator corresponding to the resource of interest is located on another node, the event management daemon requests its peer event management daemon on that other node to provide the state information generated by a resource state indicator on that node. The invention thus eliminates the need for the client to identify the destination from which the requested state information is to be obtained, to directly communicate with a resource state indicator, and to do any management of resource state acquisition beyond simply issuing the request.

Figure 4:
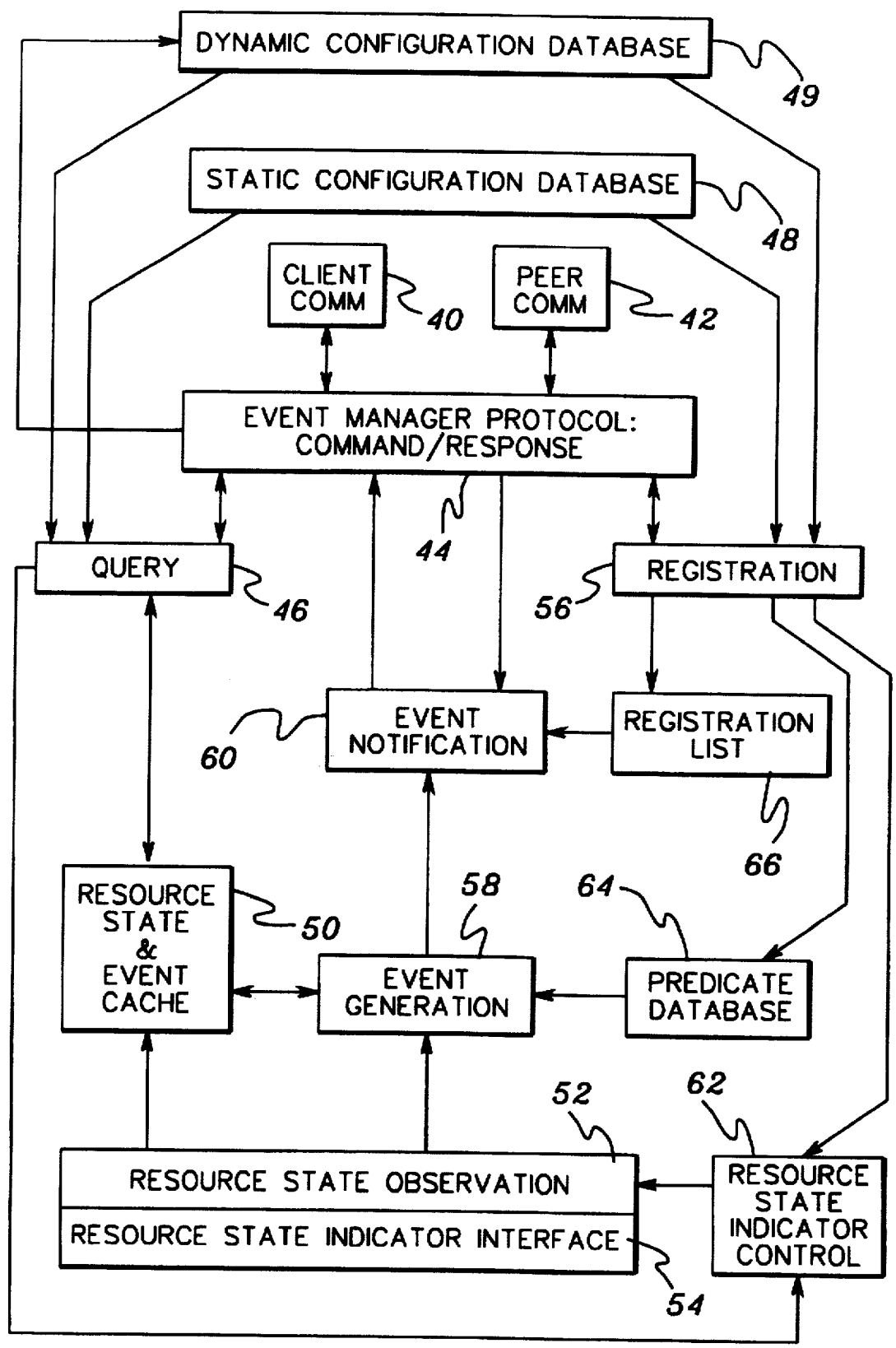
FIG. 4 depicts an exemplary configuration of modules which comprise an embodiment of the invention.

Reference is now made to FIG. 4, which depicts an exemplary event management daemon in accordance with the invention. The components of the exemplary event management daemon may be provided, for example, as a computer program product stored in memory at a node of a network for causing the node to operate in accordance with the methods and functions discussed below.

The event management daemon is provided with a client communication module 40 which may employ, for example, UNIX domain sockets for communicating with clients. The event management daemon is further provided with a peer communication module 42 for communicating with peer event management daemons on other nodes. Peer communication may be provided over communication paths as exemplified in FIG. 1. It is desirable to provide highly reliable communication between peers by reliably routing messages between peers over known active communication paths. This may be facilitated through the use of functions as described in the copending application entitled "Method for Serializing Actions of Independent Processor Groups," as described and incorporated by reference above.

The event management daemon is further provided with a command/response module 44 which communicates with the client communication module 40 and the peer communication module 42. The command/response module 44 is provided with logic for receiving and routing incoming commands and information, and for sending commands and responses.

The event management daemon is further provided with a query module 46 which communicates with the command/response module 44. The query module 46 may be provided with logic for receiving requests for states and for responding to requests for states. The query module 46 may further be provided with logic for determining the event management daemon for providing states of a particular resource, and logic for sending requests for states of non-local resources to the proper peer event management daemon. These functions may be enabled through reference to information stored in a static configuration database 48. The static configuration database 48 may include definitions of resource types, definitions of resources, and definitions of default events for resources. The static configuration database may also include information indicating whether an identifier of a resource is indicative of the event management daemon which is capable of providing states of that particular resource. Resource types and resources defined in the static configuration database are considered to be prespecified.

The functions of the registration module may further be enabled through reference to a dynamic configuration database 49. The dynamic configuration database 49 may include information correlating event management daemons with resources for which the event management daemons are not indicated by the identifier of the resource. Such resources may comprise, for example, resources which may change location within the network.

The information stored in the dynamic configuration database 49 may be provided by event management daemons which are associated with indicators of states of resources for which monitors cannot be determined from the static configuration database 48. It is preferable that the dynamic configuration database 49 is maintained at the control work station of the network, as illustrated in FIG. 1, and referenced by other event management daemons using their peer communication modules. Consequently, the dynamic configuration database 49 illustrated in FIG. 4 need not be provided for every event management daemon, as long as it exists at one event management daemon in the system.

Using the information provided by the configuration database 48, the query module 46 may thus determine the event management daemon which is capable as functioning as a provider of states of a particular resource. If the query module determines that the resource state indicator corresponding to the resource of interest is local, the query module functions as a provider of state information by obtaining the state of the resource provided by the local resource state indicator to a resource state and event cache 50. The resource state and event cache 50 contains current state information provided by all resource indicators located on the node of the event management daemon. The cache 50 may further include previous state values of those resources. The cache may also include events generated by each resource at the node. However, such data pertains to the related event management functions of event generation and registration, which, as discussed below, are the subject of a copending application and are not necessary to enable the operation of the invention which is the subject of the present application.

State information is provided to the resource state and event cache 50 by a resource state observation module 52. The operation of the resource state observation module 52 may be initiated by a resource state indicator control module 62 which receives instruction from the query module 46. The resource state observation module observes state information provided by resource state indicators through a resource state indicator interface 54 and forwards those states to the resource state and event cache 50. The interface provided for indicators may comprise shared memory, for example shared memory as is provided by the Performance Toolbox For AIX product available from IBM. The resource state observation module 52 may observe state data periodically at a rate which may be configured. However, it has been found preferable to observe the states of those resources which are represented by binary states, i.e. up or down, at every instance at which the state of the resource changes. Consequently, for such resources it is preferable to provide a communication path from state indicators of such resources to the resource state observation module 52 such that each instance of change of the state is observed and forwarded to the resource state and event cache 50.

It will be noted that a number of other modules are illustrated in the exemplary event management daemon of FIG. 4, including modules for registration 56, event generation 58, and event notification 60, as well as a registration list 66 and a predicate database 64. These modules are intended for providing the related event management function of event registration and notification, which is the subject of the copending application "Responding to Requests for Notice of Events" which incorporated by reference above. While it is preferable to provide these additional modules in an event management daemon, their functions are not necessary to enable the operation of the invention which is the subject of the present application or to disclose its best mode.

The exemplary event management daemon of FIG. 4 thus serves as a system which comprises an embodiment of the invention. The exemplary event management daemon of FIG. 4 similarly serves to perform methods which comprise an embodiment of the invention. Methods embodying the invention may be further understood by reference to FIG. 5–FIG. 7.

Reference is now made to FIG. 5, which depicts a method for processing a request for a state of a resource. In this method, a request for a state of a resource is received [70] from a client. The request includes an identifier of the resource in which the event will occur. In the embodiment of FIG. 4, the request may be received through the client communication module 40 if it originates locally to the event management daemon, or it may be received through the peer communication module 42 from another event management daemon if it does not originate locally. In either case, the request may then be provided by the command/response module 44 to the query module 46.

The identifier received [70] in the method of FIG. 5 may comprise, for example, a unique character string. As an illustration, an identifier of the resource defined as the operational state of node 1 of a network could be "NODE1".

Alternatively, as depicted in FIG. 5a, receiving [70] the identifier may include receiving [74] an identifier of the type of the resource such that the full identifier comprises an identifier of the resource type and an identifier of the particular resource of that type which is of interest. As an illustration, a prespecified resource of the network may be defined as the percentage of total free space of a logical volume. The resource type may therefore be named LogVol.%totfree. Specific resources of this type may be defined in the resource definition as being specified by the elements of a node number, a volume group, and a logical volume. An identifier of a particular resource of the type LogVol.%totfree may therefore take the form (NodeNum=____, VG=____, LV=____). Such an identifier may be referred to as an instance vector. When using an instance vector in combination with a resource type to identify a resource, it is preferred whenever possible that the instance vector include the number of the node from which the resource may always be monitored, for reasons which will be explained below.

The use of an instance vector allows grouping of requests, e.g. specifying a single resource type and several resources of that type, and wildcarding, e.g. specifying a single resource type and all resources of that type fitting a given criterion. By providing a wildcard symbol for one of the elements of the instance vector, a number of resources of that type may be specified using a single instance vector. All resources of a resource type may similarly be identified simultaneously by providing a single wildcard symbol.

Returning to FIG. 5, the method illustrated in FIG. 5 comprises the further step of identifying [72] a provider associated with the resource state indicator which provides state data for the resource of interest. As shown in FIG. 3, the provider may comprise an event management daemon. Referring to FIG. 5a, identifying the provider may comprise determining |76| that the provider is identified by the resource identifier. As an example, the LogVol.%totfree resource type will be used. It may be true that for this type of resource, the elements of the instance vector (NodeNum=____, VG=____, LV=____) provide sufficient information to identify the provider associated with the resource because the resource will always be located on a particular node, and therefore the NodeNum element of the instance vector will reliably identify both the node of the resource and the node of the provider associated with it. In the embodiment of FIG. 4, determination of whether the instance vector identifies providers for a particular type of resource may be made by logic provided to the query module 46, through reference to information specifying whether this condition is true for that particular type of resource. Such information could be provided, for example, in the static configuration database 48. If it is determined that providers for the identified type of resource are identified by the resource identifiers, the provider may then be determined [78], for example, from the NodeNum element of the instance vector. In the embodiment of FIG. 4, this may be performed by logic provided in the query module 46.

Alternatively, as illustrated in FIG. 5b, identifying [72] a provider associated with the resource state indicator corresponding to the resource which the client has specified by its identifier may be accomplished by consulting [80] a configuration database which correlates providers with resources. This would be done if it was determined that the resource was not of the type for which the instance vector indicates a provider. In the embodiment of FIG. 4, this may be performed by the registration module 56 using information provided by the dynamic configuration database 49.

Figure 6:
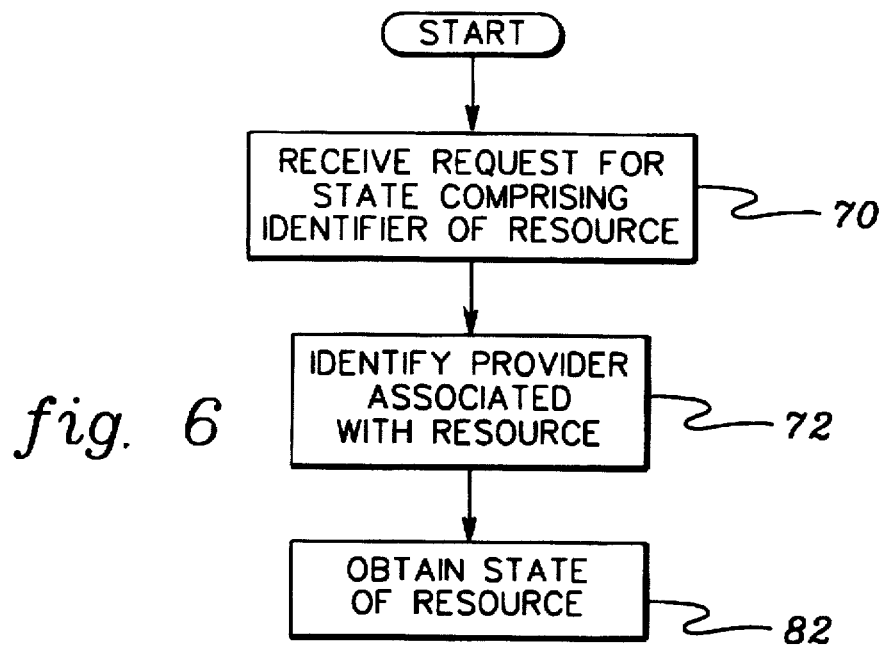
FIG. 6 depicts a further method for processing a request for state information in accordance with the invention.
Figure 6A:
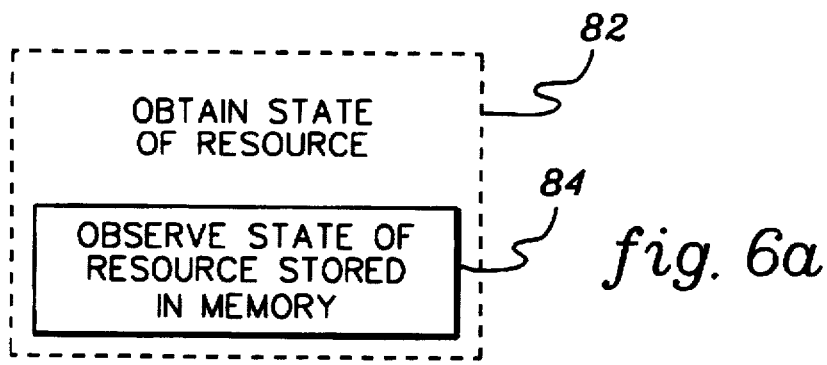
FIG. 6a depicts details of an embodiment of the method of FIG. 6.
Figure 6B:
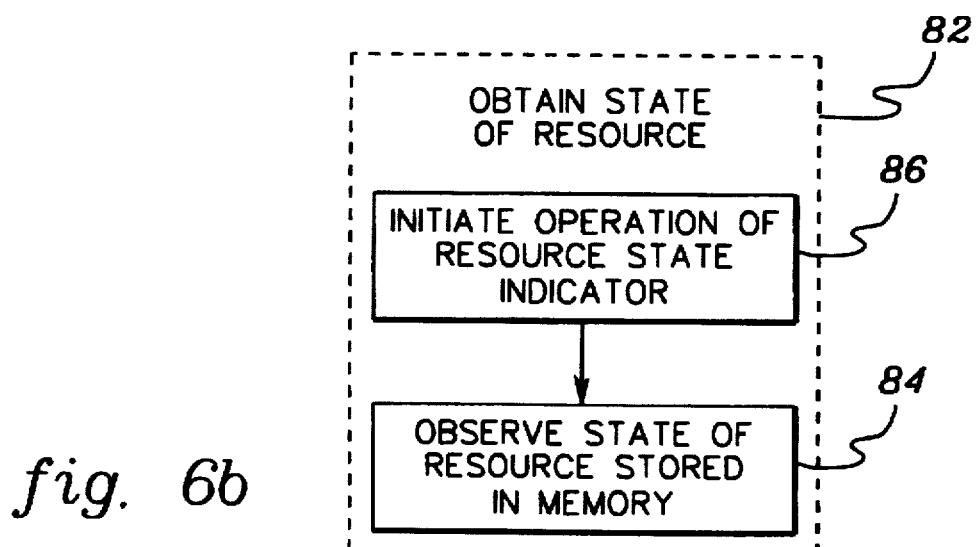
FIG. 6b depicts details of an embodiment of the method of FIG. 6.

Referring now to FIG. 6, the processing method as illustrated in FIG. 5 may further comprise obtaining [82] the state of the identified resource. Referring to FIG. 6a, this may be accomplished in some cases by the local event management daemon acting as the provider by observing |84| a state of the resource stored in memory, such as the resource state and event cache 50 as illustrated in FIG. 4. In some instances it will be determined that no state information is available in memory because operation of the resource state indicator has not been initiated. In such instances, as illustrated in FIG. 6b, it may be necessary to initiate |86| the operation of the resource state indicator. In the embodiment of FIG. 4, this may be accomplished by a resource state indicator control 62.

Figure 6C:
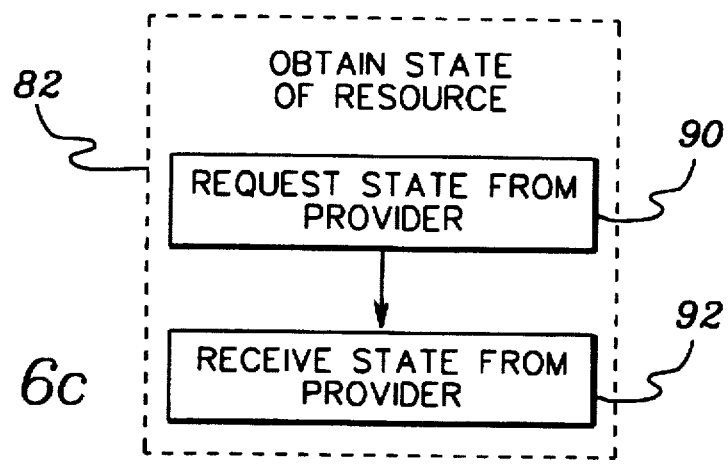
FIG. 6c depicts details of an embodiment of the method of FIG. 6.

In other cases, as shown in FIG. 6c, obtaining the state of the resource may comprise requesting |90| the state of the resource from a provider which is associated with the resource state indicator. The state will be obtained in this manner when it is determined that the provider is not local to the node at which the request for state information was initially received. In these cases, the provider may be the event management daemon local to the node of the resource state indicator associated with the resource of interest. Therefore, as illustrated in FIG. 6c, retrieving the state from the provider will comprise requesting |90| the state from the provider and receiving [92] the state from the provider. In the embodiment of FIG. 4, the determination that the resource state indicator is not local may be made by the query module 46, and the request for the state may be routed through the command/response module 44 and the peer communication module 42, over a communication path to the remote event management daemon. The remote event management daemon will receive and process the request in the manner described above for processing a request for a state of a resource where the provider is determined to be local to the node at which the request is received. The state information will then be returned over the communication path to the local event management daemon through the peer communication module 42.

Figure 7:
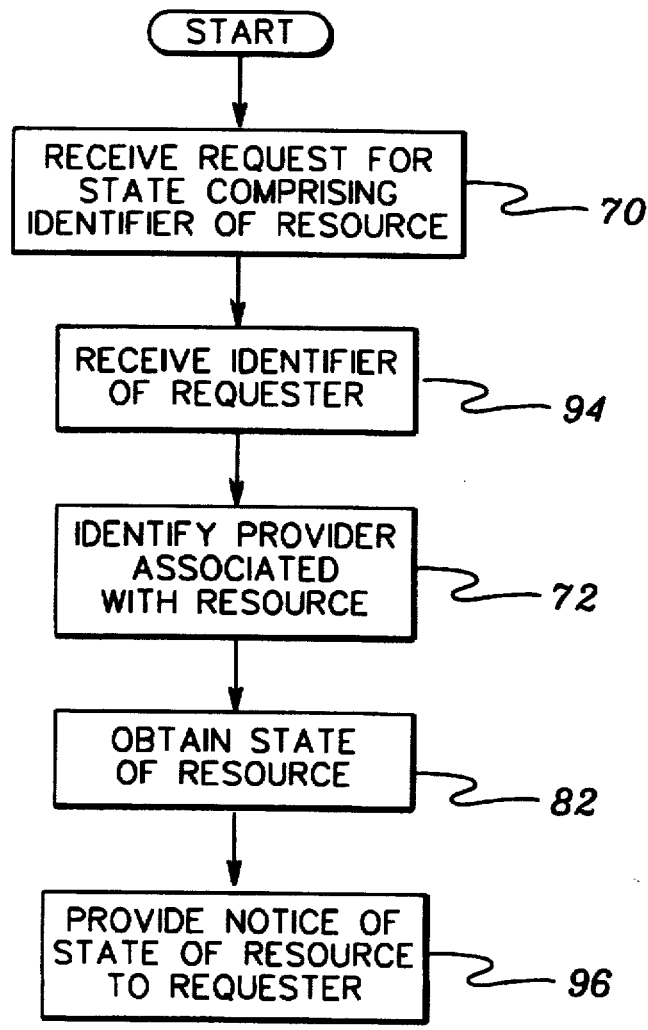
FIG. 7 depicts a further method for processing a request for state information in accordance with the invention.

Referring now to FIG. 7, the processing method as illustrated in FIG. 6 may further comprise receiving |94| an identifier of the requester of the state and providing |96| notice of the state of the resource to the requester of the state. In the embodiment of FIG. 4, the identifier of the requester may be received through the client communication module 40, and the state may be returned to the requester through the client communication module 40.

Accordingly, the invention may be embodied in a method of processing a request for a state of a resource where the method comprises receiving an identification of a resource and identifying the indicator of states of that resource. The method may further comprise obtaining the state of the resource. Referring to the embodiment of FIG. 4, the modules illustrated therein, when implemented for example in the form of a programmed processing node in a network, may provide a system embodying the invention, such modules acting in concert to provide means for receiving an identification of a resource and means for identifying the indicator of states of that resource. Similarly, a computer program product which implements such a system on a processing node of a network may embody the invention where that computer program product comprises computer program product means for receiving an identification of a resource and computer program product means for identifying the indicator of states of that resource.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A system comprising:

a network of computers arranged in a distributed computing environment;

a resource in said network of computers, said resource being movable in said network of computers and having one or more a states;

means for receiving a request for a state of said resource, said request comprising an identifier of said resource;

means for identifying a provider associated with an indicator of states of said resource, said indicator indicating the states of said resource and said provider obtaining the states from said indicator and providing it to said requester, said states being provided to said requester irrespective of whether the resource has changed location in the network;

means for initiating the operation of said indicator such that said indicator places said state in a memory device shared with said provider so that it may be observed by said provider; and means for observing by said provider, said state in said shared memory device for obtaining a state of said resource from said indicator.

2. The system of claim 1, wherein said identifier indicates that said resource is of a prespecified resource type.

3. The system of claim 2, wherein said means for identifying said provider comprises means for determining that providers associated with indicators of states of resources of said type are identified by identifiers of resources of said type.

4. The system of claim 1, wherein said means for identifying said provider comprises means for determining said indicator from a database which correlates resources with providers of states of resources.

5. The system of claim 1, wherein said means for obtaining said state comprises means for said provider to retreive said state periodically at a predetermined rate from a memory device containing data representative of the state of said resource.

6. The system of claim 1, wherein said means for obtaining comprises:

means on a first node in said distributed computing environment for requesting said state from a provider of states associated with said indicator on a second node in said distributed computing environment, and means for receiving said state from said provider.

7. The system of claim 1, further comprising:

means for receiving from said requester via a client communications module identification of said requester of said state; and means for indicating to said requester via said client communications module said state to said requester.

8. In a network of computers, a system for processing a request from a requester for a state of a network resource on a distributed computing environment, said system comprising:

a client for receiving a request for a state of a resource;

an identifier in said request identifying a prespecified network resource;

an indicator of states of said resource; and a provider connected to said client and associated with said indicator of states of said resource, said indicator indicating the states of said resource and said provider obtaining the states from said indicator and providing it to said requester, said states being provided to said requester irrespective of whether the resource has changed location in the network;

a shared memory device; and said indicator initiates an operation placing the state of said resource in said shared memory device so that it may be observed by said provider, and said provider obtains said state of said resource from said indicator.

9. The system of claim 8, wherein said identifier indicates that said resource is of a prespecified resource type, and a query module for determining that said provider is identified by said identifier.

10. The system of claim 9, wherein said query module comprises determining that providers associated with indicators of states of resources of said type are identified by identifiers of resources of said type such that the provider may be determined.

11. The system of claim 8, further comprising:

a configuration database which correlates providers with resources; and wherein said provider determines said indicator from said configuration database.

12. The system of claim 8 further comprising:

an interface to a memory device containing data representative of the state of said resource; and wherein said provider retreives said state periodically at a predetermined rate from said memory device.

13. The system of claim 8, wherein said provider comprises:

a first event memory management daemon on a first node in said distributed computing environment for requesting said state over a peer communications module to a second node in said distributed computing environment;

a second event memory management daemon on said second node requesting said state associated with said indicator on said second node and sending said state to said first event memory management daemon over said peer communications module; and wherein said first event memory management daemon receives said state from said secon event memory management daemon.

14. The system of claim 8, further comprising:

a client communications module receiving from said requester, an indication of said requester of said state; and wherein said state is provided to said requester via said client communications module.

* * * * *